United States Patent
Yebka et al.

(10) Patent No.: US 11,761,467 B2
(45) Date of Patent: Sep. 19, 2023

(54) SCREW RELEASE

(71) Applicant: LENOVO (Singapore) PTE. LTD., New Tech Park (SG)

(72) Inventors: Bouziane Yebka, Apex, NC (US); Tin-Lup Wong, Chapel Hill, NC (US); Philip Jakes, Durham, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 268 days.

(21) Appl. No.: 16/951,755

(22) Filed: Nov. 18, 2020

(65) Prior Publication Data
US 2022/0154748 A1     May 19, 2022

(51) Int. Cl.
| F16B 31/00 | (2006.01) |
| F16B 5/02 | (2006.01) |
| F16B 31/02 | (2006.01) |

(52) U.S. Cl.
CPC .............. *F16B 5/02* (2013.01); *F16B 31/005* (2013.01); *F16B 31/028* (2013.01)

(58) Field of Classification Search
CPC ...... F16B 31/00; F16B 31/005; F16B 31/007; F16B 2031/002; F16B 31/02
USPC ........................ 411/2, 5, 390, 391
See application file for complete search history.

(56) References Cited

U.S. PATENT DOCUMENTS

| 3,120,149 | A | * | 2/1964 | Dickie | F42B 3/006 89/1.14 |
| 3,204,515 | A | * | 9/1965 | Dickie | F16B 31/005 411/434 |
| 3,405,593 | A | * | 10/1968 | Kriesel | F16B 31/005 89/1.14 |
| 3,635,435 | A | * | 1/1972 | Perison, Sr. | B60R 1/04 403/349 |
| 3,899,196 | A | * | 8/1975 | Dashner | F16K 17/40 285/422 |
| 4,436,273 | A | * | 3/1984 | Yuda | B60R 1/04 248/909 |
| 4,902,046 | A | * | 2/1990 | Maloberti | F16L 23/02 285/34 |
| 5,199,834 | A | * | 4/1993 | Seidl | B60R 21/215 296/35.3 |
| 5,927,747 | A | * | 7/1999 | Farrington | B60R 21/215 280/732 |
| 7,862,282 | B2 | * | 1/2011 | Smith | F16B 31/005 411/433 |
| 8,850,765 | B2 | * | 10/2014 | Amengual Pericas | E01F 15/0476 52/169.9 |

* cited by examiner

*Primary Examiner* — Flemming Saether
(74) *Attorney, Agent, or Firm* — Kunzler Bean & Adamson; Bruce R. Needham

(57) ABSTRACT

For screw release, an apparatus includes a boss, a screw secured to the boss, and a force release component connected to one of the boss and the screw. The force release component releases a portion of the screw from the boss in response to a specified force.

19 Claims, 7 Drawing Sheets

SCREW RELEASE

FIELD

The subject matter disclosed herein relates to screw release and more particularly relates to screw release in response to a specified force.

BACKGROUND

Screws in bosses hold assemblies together.

BRIEF SUMMARY

An apparatus for screw release is disclosed. The apparatus includes a boss, a screw secured to the boss, and a force release component connected to one of the boss and the screw. The force release component releases a portion of the screw from the boss in response to a specified force. A system and method also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
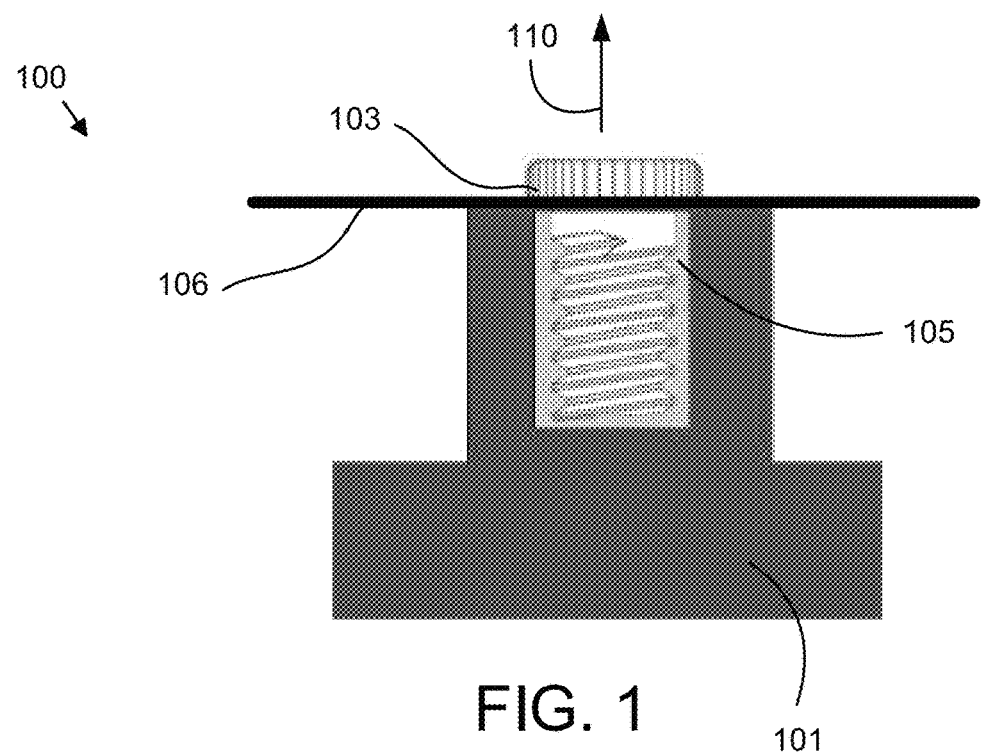
FIG. 1 is a side view drawing illustrating one embodiment of a boss and screw.

FIG. 1 is a side view drawing illustrating one embodiment of a boss 101 and a screw 103 in a connection system 100. The screw 103 is secured to the boss 101. The screw 103 may secure a component 106 to the boss 101. The boss 101 may be physically connected to an assembly, a frame, a chassis, and the like. In one embodiment, the boss 101 is physically connected to the chassis of a portable computer.

Although the screw 103 secures the component 106 to the boss 101, there are circumstances when it is advantageous for the screw 103 to allow the component 106 to separate from the boss 101. For example, the screw 103 may secure a panel component 106 to a boss 101 disposed on the chassis of a portable computer. Under some circumstances, a rechargeable battery for the portable computer may swell in size, exerting significant force between the panel component 106 and the boss 101. The swollen battery may crack the panel component 106 and/or the chassis connected to the boss 101, effectively destroying the portable computer.

The embodiments include a force release component 105 connected to one of the boss 101 and the screw 103. The force release component 105 releases a portion of the screw 103 from the boss 101 in response to a specified force 110 as will be described hereafter. As a result, the component 106 may separate from the boss 101 without damage to the component 106, the boss 101, and/or members connected to the component 106 and/or boss 101. As a result, damage caused by excessive forces between the boss 101 and the screw 103 is easily repaired, reducing service costs for products employing the screw 103 and the boss 101.

In one embodiment, the force release component 105 is connected to one of the boss 101 and the screw 103. In addition, the force release component 105 may be connected to both the boss 101 and the screw 103. In a certain embodiment, a first connections of the boss 101 to the force release component 105 and a second connection of the screw 103 to the force release component 105 may be fractured, severed, and/or broken with different amounts of force. For example, a higher force may be required to fracture, sever, and/or break the first connection than to break the second connection. The force release component 105 releases a portion of the screw 103 from the boss 101 in response to the specified force 110.

Figure 2A:
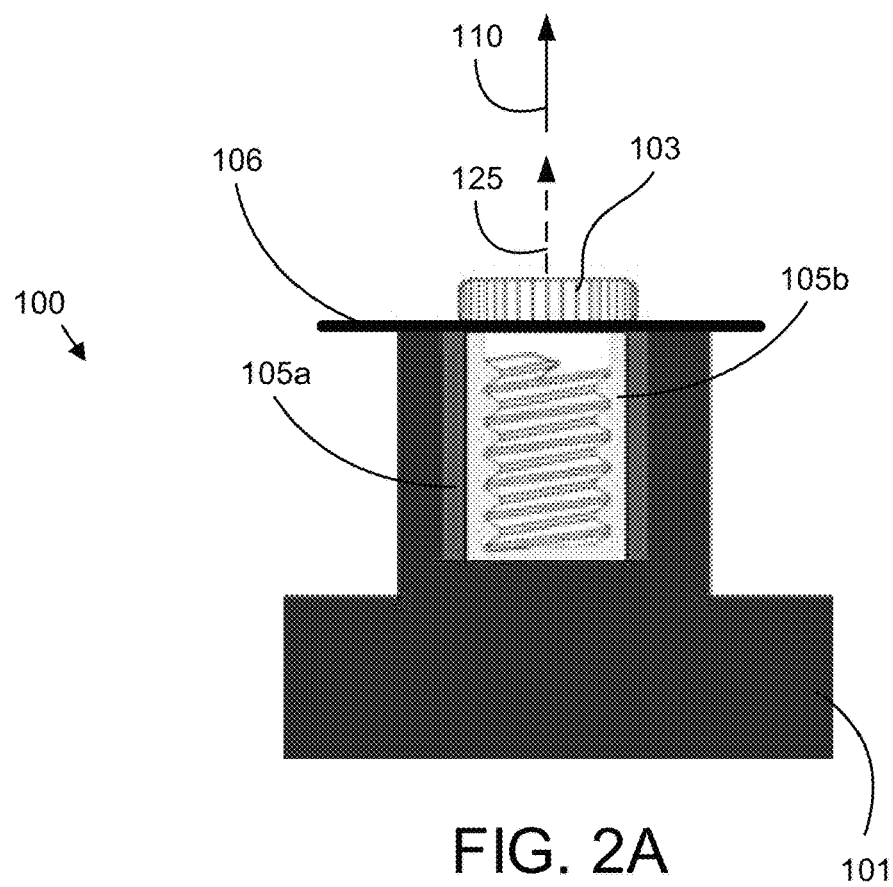
FIG. 2A is a side view drawing illustrating one embodiment of a boss, a screw, and a force release component.

FIG. 2A is a side view drawing illustrating one embodiment of a boss 101, a screw 103, and a force release component 105. In the depicted embodiment, the force release component 105 includes an inner force release component 105*b* and an outer force release component 105*a*. The inner force release component 105*b* may separate from the outer force release component 105*a* in response to the specified force 110. The outer force release component 105*a* may require a higher force than the specified force 110 to separate from the boss 101.

In response to the specified force 110, the inner force release component 105*b* separates from the outer force release component 105*a*. As used herein, the inner force release component 105*b* is separated from the outer force release component 105*a* if the inner force release component 105*b* is displaced relative to the outer force release component 105*a*. The inner force release component 105*b* may separate from the outer force release component 105*a* while still overlapping a portion of the outer force release component 105*a*.

As a result of the inner force release component 105*b* separating from the outer force release component 105*a*, the screw 103 is released from the boss 101, relieving the force between the boss 101 and the component 106. In one embodiment, the specified force 110 is substantially along a screw axis 125. As used herein, substantially is within 30 degrees of the screw axis 125. The screw axis 125 may be coaxial with the screw 103. In addition, the screw access 125 may be coaxial with the boss 101. In one embodiment, the specified force 110 is specified for a force component along the screw axis 125.

Figure 2B:
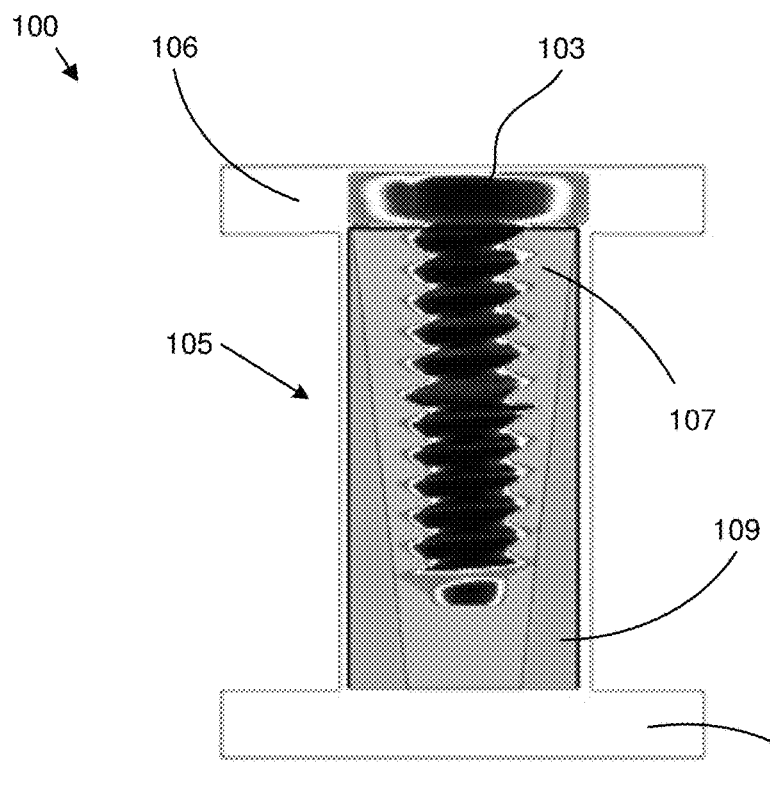
FIG. 2B is a side view drawing illustrating one embodiment of a release sleeve and an anchor.

FIG. 2B is a side view drawing illustrating one embodiment of a release sleeve 107 and an anchor 109 in a connection system 100. The release sleeve 107 and the anchor 109 may comprise the force release component 105. In one embodiment, the release sleeve 107 is the inner force release component 105*b* and the anchor 109 is the outer force release component 105*a*.

The boss 101 is secured to the anchor 109. The release sleeve 107 is fracturably secured to the anchor 109 of the boss 109. The release sleeve 107 may be bonded to the anchor 109 with a fracturable adhesive. In addition, the release sleeve 107 may be press fit into the anchor 109. The screw 103 is secured within the release sleeve 107. The release sleeve 107 separates from the anchor 109 in response to the specified force 110. For example, the specified force 110 may fracture the adhesive. In addition, the specified force 110 may break the press fit.

Figure 2C:
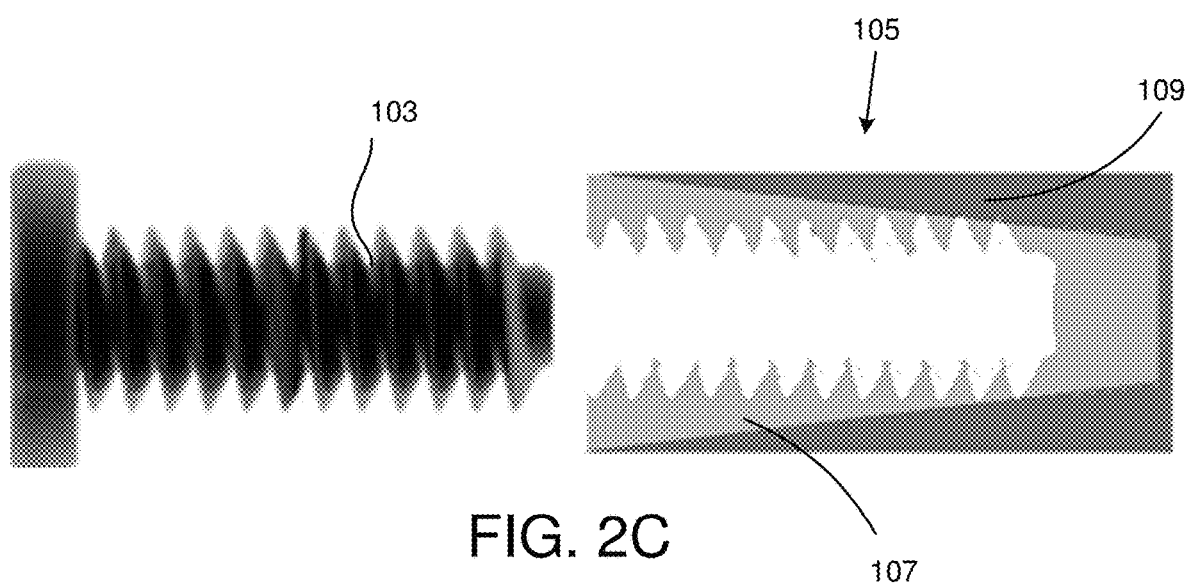
FIG. 2C is a side view drawing illustrating one alternate embodiment of a release sleeve and an anchor.

FIG. 2C is a side view drawing illustrating one alternate embodiment of the release sleeve 107 and the anchor 109. In the depicted embodiment, the release sleeve 107 and the anchor 109 are separated from the boss 101. The release sleeve 107 and the anchor 109 may be inserted into the boss 101 to allow the boss 101 to receive the screw 103. Because the anchor 109 and/or anchor 109 and release sleeve 107 may be separated from the boss 101, a new anchor 109 and/or release sleeve 107 may be connected to the boss 101 after the release sleeve 107 and/or force release component 105 separates from the anchor 109 and/or boss 101, supporting easy repairs after a separation of the release sleeve 107 and/or force release component 105.

Figure 2D:
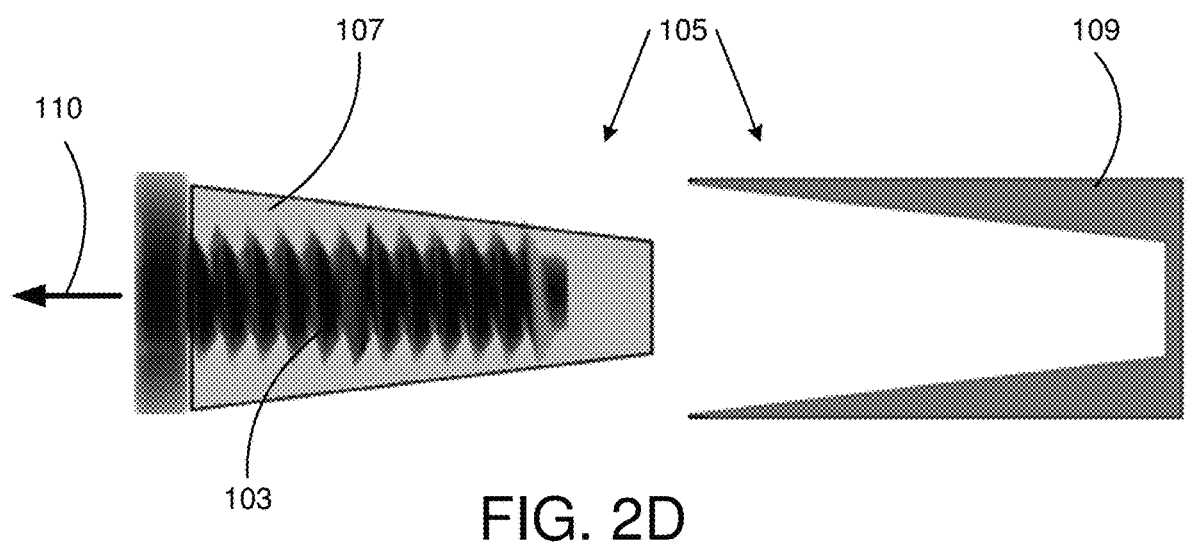
FIG. 2D is a side view drawing illustrating one embodiment of a separated release sleeve and anchor.

FIG. 2D is a side view drawing illustrating one embodiment of a separated release sleeve 107 and anchor 109. In the depicted embodiment, the release sleeve 107 is separated from the anchor 109 in response to the specified force 110. In one embodiment, the release sleeve 107 may be re-adhered to the anchor 109 with an adhesive. In addition, the release sleeve 107 may be re-press fit to the anchor 109. As a result, the screw 103 and boss 101 may be easily repaired after a separation.

Figure 2E:
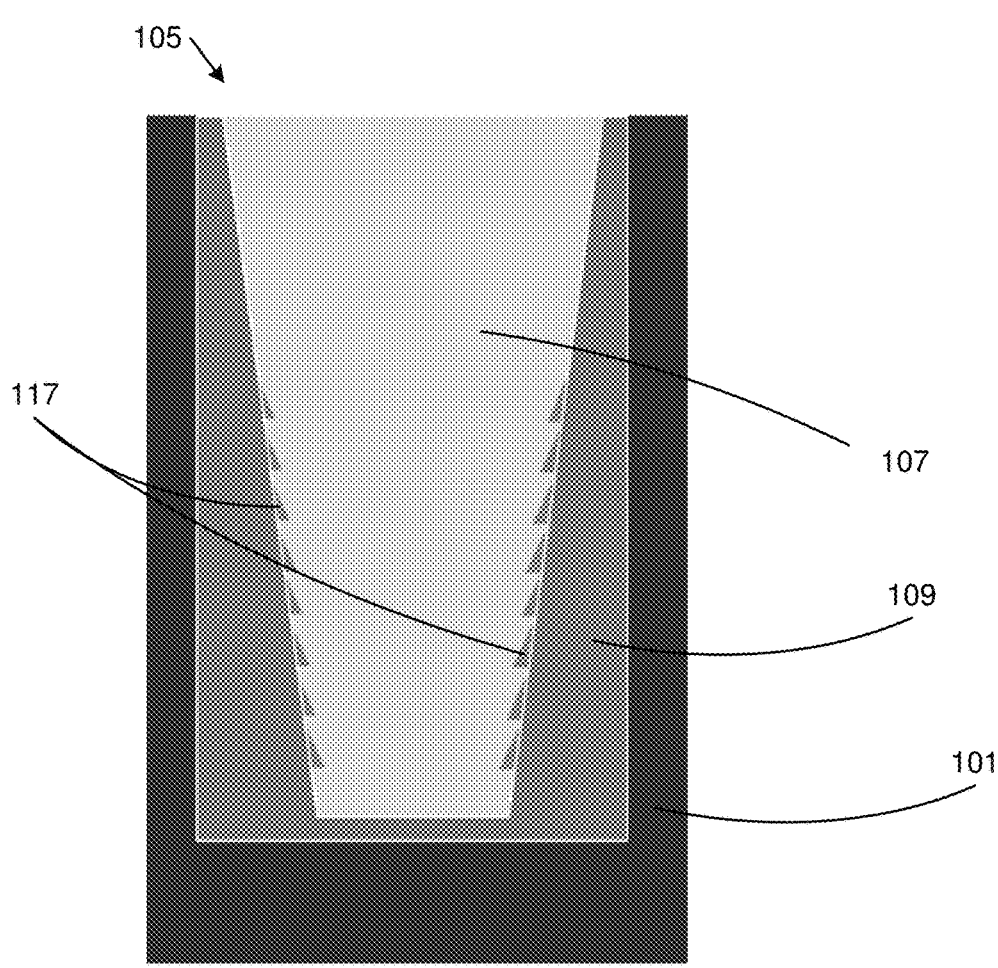
FIG. 2E is a side view drawing illustrating one embodiment of a sleeve grooves.

FIG. 2E is a side view drawing illustrating one embodiment of a sleeve groove 117. One or more sleeve grooves 117 may be formed in the release sleeve 107. The sleeve grooves 117 may modify the specified force 110 needed to release a portion of the screw 103 from the boss 101. In one embodiment, the sleeve grooves 117 reduce the specified force 110. In an alternative embodiment, the sleeve grooves 117 increase the specified force 110. As a result, the specified force 110 may be modified.

Figure 3A:
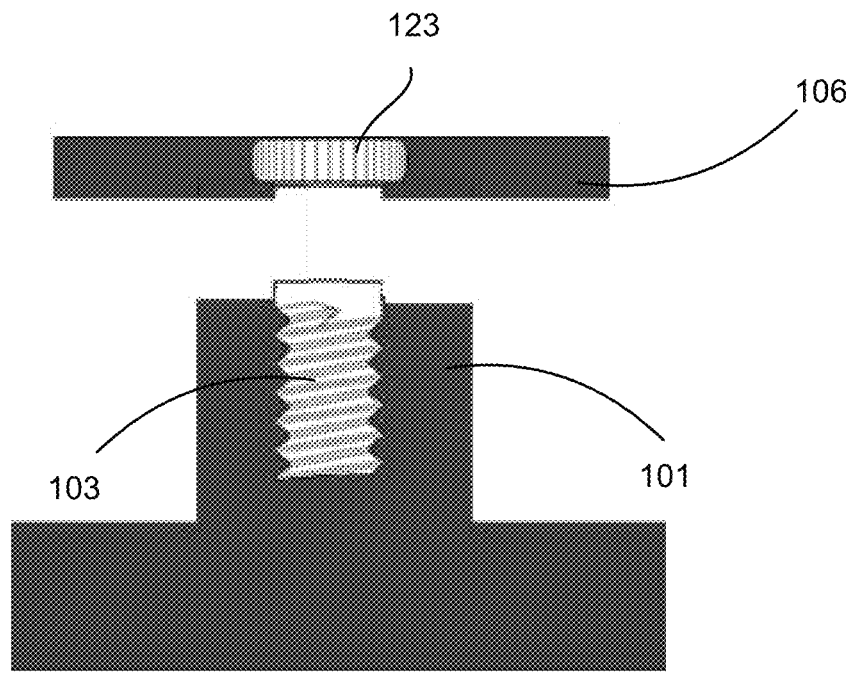
FIG. 3A is a side view drawing illustrating one embodiment of a separating screw head.

FIG. 3A is a side view drawing illustrating one embodiment of a separating screw head 123. In the depicted embodiment, the force release component 105 is a screw head 123 that separates from the screw 103 in response to the specified force 110. For example, the screw head 123 may be fracturably connected to the screw 103. The screw head 123 may be bonded to the screw 103 with an adhesive. In addition, slits in the screw 103 may weaken the connection between the screw 103 and the screw head 123.

In response to the specified force 110, the screw head 123 separates from the screw 103. As a result, the component 106 is not physically connected to the boss 101.

Figure 3B:
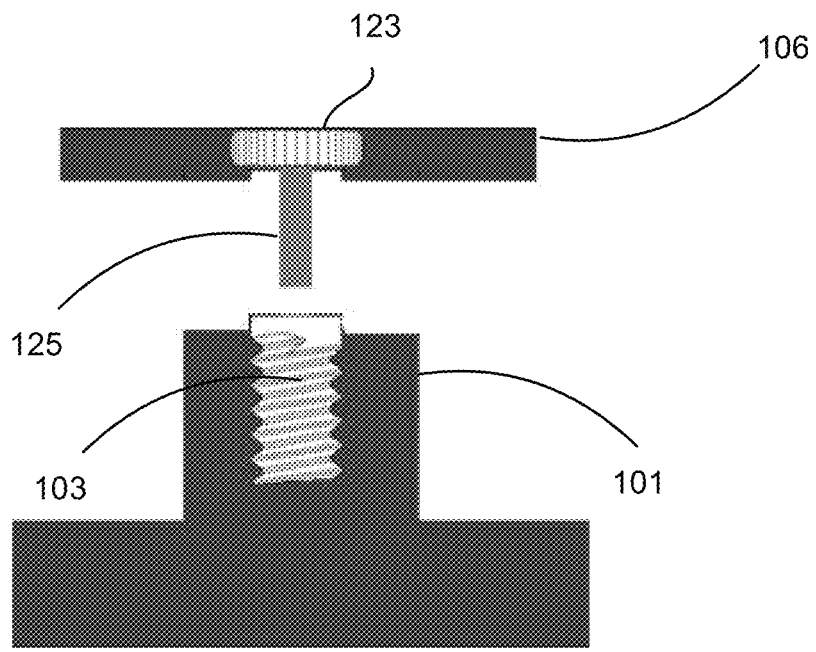
FIG. 3B is a side view drawing illustrating one alternate embodiment of a separating screw head.

FIG. 3B is a side view drawing illustrating one embodiment of a separated screw head 123. In the depicted embodiment, the screw head 123 includes a screw plunger 125. The screw plunger 125 may be coaxial with the screw 103. In one embodiment, the screw plunger 125 is bonded to the screw 103 with an adhesive. In addition, the screw plunger 125 may be press fit to the screw 103. The screw head 123 and the screw plunger 125 separate from the screw 103 in response to the specified force 110.

Figure 4A:
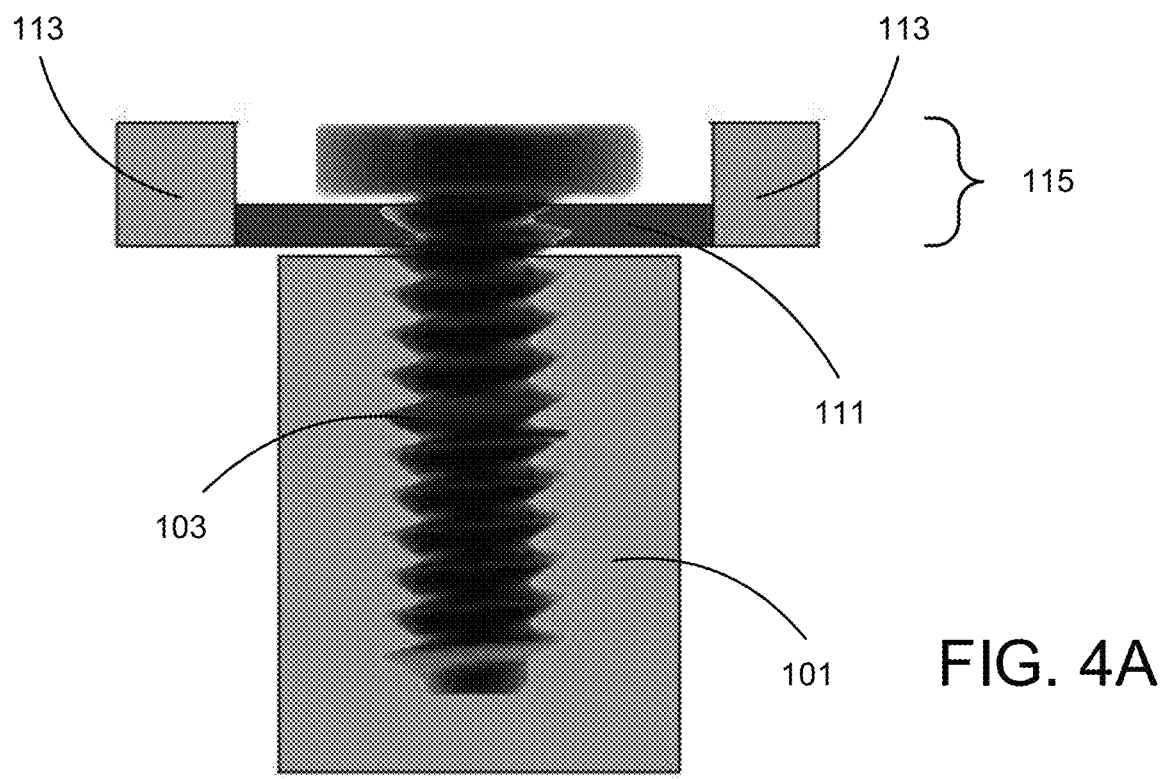
FIG. 4A is a side view drawing illustrating one embodiment of a release washer.

FIG. 4A is a side view drawing illustrating one embodiment of a release washer 113. In the depicted embodiment, the force release component 105 is embodied in the release washer 115. A portion of the release washer 115 may separate from the screw 103 in response to the specified force 110.

The release washer 115 may include a base portion 111 and a detachable portion 113. The detachable portion 113 may be bonded to the base portion 111 with an adhesive. In addition, the detachable portion 113 may be press fit to the base portion 111.

Figure 4B:
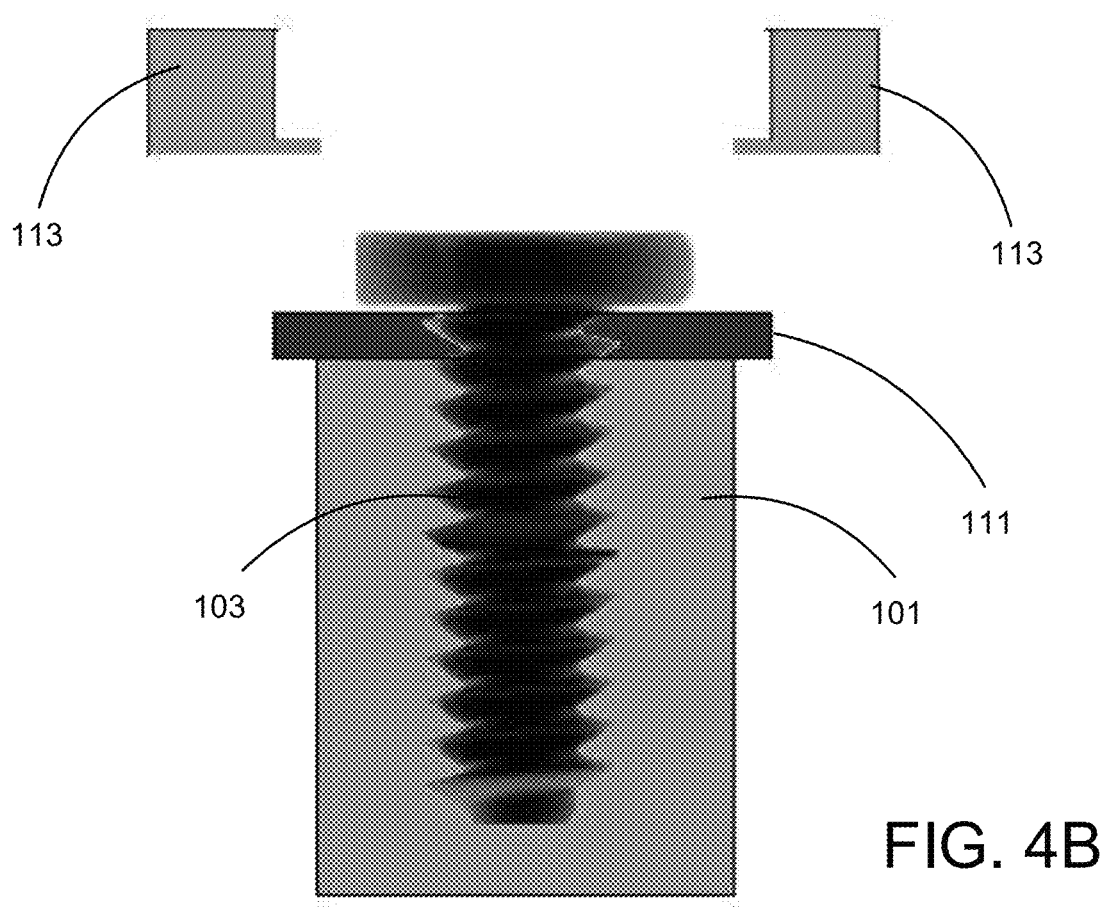
FIG. 4B is a side view drawing illustrating one embodiment of a separated release washer.

FIG. 4B is a side view drawing illustrating one embodiment of a separated release washer 115. In the depicted embodiment, the detachable portion 113 is separated from the base portion 111 in response to the specified force 110. As a result, the detachable portion 113 separates from the screw 103.

Figure 5:
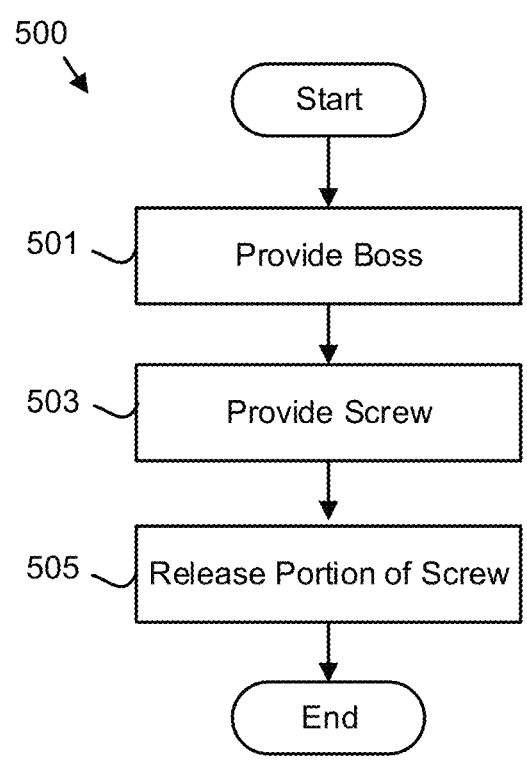
FIG. 5 is a schematic flow chart diagram illustrating one embodiment of a force release method.

FIG. 5 is a schematic flow chart diagram illustrating one embodiment of a force release method 500. The method 500 may release a portion of the screw 103 from the boss 101 in response to the specified force 110.

The methods 500 starts, and in one embodiment, the method 500 provides 501 the boss 101. In addition, the method 500 may provide 503 the screw 103 secured to the boss 101. In response to the specified force 110, the force release component 105 releases 505 a portion of the screw 103 from the boss 101. The force release component 105 may comprise the release sleeve 107 secured to the anchor 109. In addition, the force release component 105 may comprise the screw head 123 that separates from the screw 103. In a certain embodiment, the screw head 123 includes the screw plunger 125. The force release component 105 may comprise the release washer 115.

Figure 6A:
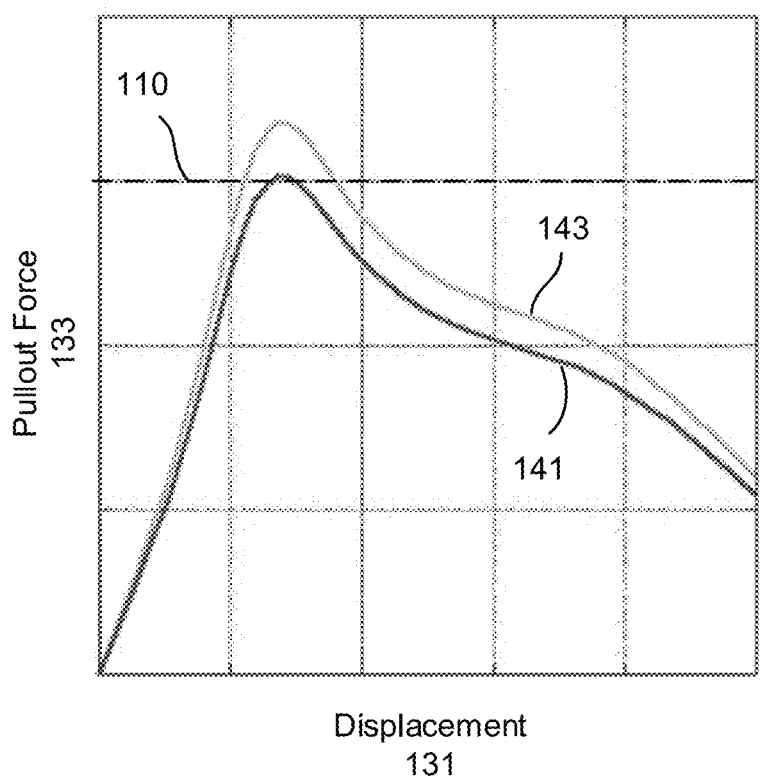
FIG. 6A is a graph illustrating one embodiment of release forces for a force release component.

FIG. 6A is a graph illustrating one embodiment of release forces for a force release component 105. Line 141 shows the displacement 131 of the release sleeve 107 relative to a pullout force 133. Line 143 shows the displacement 131 of the anchor 109 relative to the pullout force 133. In the depicted embodiment, there is minimal displacement 131 of the release sleeve 107 until the pullout force 133 is equal to the specified force 110. The displacement of the release sleeve 107 reduces the pullout force 133. However, the anchor 109 may be removed from the boss 101 with sufficient pullout force 133 to support repairs to the boss 101 and screw 103.

Figure 6B:
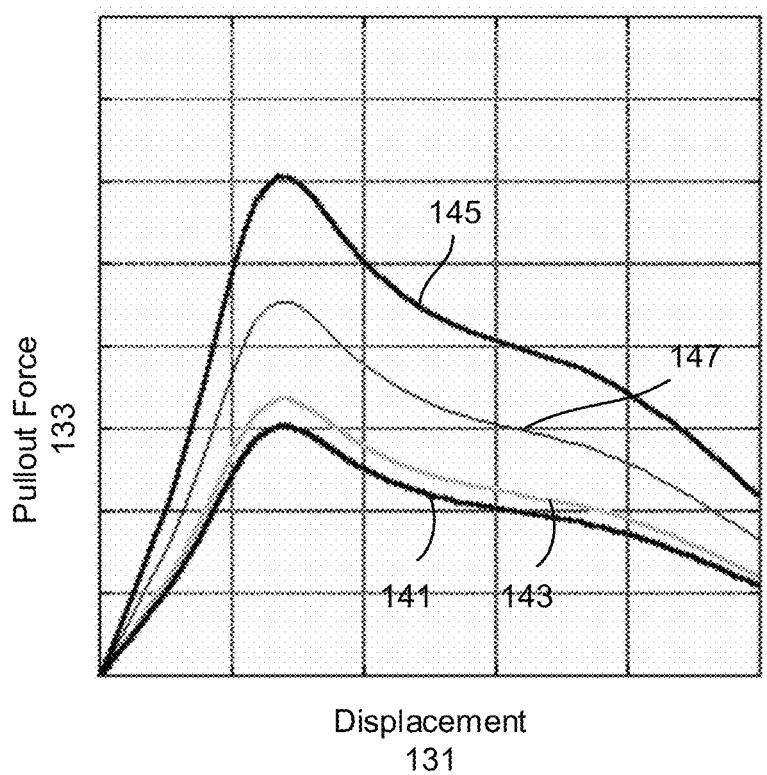
FIG. 6B is a graph illustrating one embodiment of release forces for a force release component.

FIG. 6B is a graph illustrating one embodiment of release forces for a force release component 105. Lines 145 and 147 show the displacement 131 of anchor 109 with different bonding to the boss 101. Different bonding may modify the difference between the pullout force 133 required to displace the anchor 109 and the release sleeve 107.

The release component 105 connected to one or more of the boss 101 and screw 103 releases a portion of the screw 103 in response to the specified force 110. As a result, damage from excessive forces between the boss 101 and the screw 103 are mitigated.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a boss;
a screw comprising a head and a threaded shaft; and
a force release component connected to the boss and to the threaded shaft of the screw, the force release component comprising an anchor disposed within a recess of the boss and a release sleeve disposed within a recess of the anchor, the release sleeve is bonded to the anchor, the threaded shaft connected to the release sleeve, wherein, the bond between the anchor and the release sleeve comprises a bonding strength such that, in response to a specified force, the release sleeve is configured to separate from the anchor and break the bond along an interface between the release sleeve and the anchor to release at least a portion of the screw from the boss, wherein the bonding strength between the anchor and the release sleeve is less than a bonding strength between the anchor and the boss.

2. The apparatus of claim 1, wherein the release sleeve comprises a sleeve groove shaped to modify the specified force.

3. The apparatus of claim 1, wherein the specified force is substantially along a screw axis.

4. The apparatus of claim 1, wherein the interface between the anchor and the release sleeve is tapered.

5. The apparatus of claim 4, wherein a diameter of the release sleeve on an end of the release sleeve proximal to the head of the screw is larger than a diameter of the release sleeve on an end of the release sleeve distal the head of the screw.

6. The apparatus of claim 1, wherein the force release component has an outer shape that is cylindrical and fits in a cylindrical opening in the boss.

7. The apparatus of claim 1, wherein the screw secures a component to the boss.

8. The apparatus of claim 7, wherein the screw secures the component to the boss by inserting the threaded shaft through an opening in the component and screwing the screw into the force release component, wherein a diameter of the opening of the component is less than an outer diameter of the head.

9. The apparatus of claim 7, wherein the component is a first component and the boss is connected to second component, wherein the screw secures the first component to the boss and to the second component.

10. A system comprising:
a boss;
a screw comprising a head and a threaded shaft;
a component secured by the screw to the boss; and
a force release component connected to the boss and to the threaded shaft of the screw, the force release component comprising an anchor disposed within a recess of the boss and a release sleeve disposed within a recess of the anchor, the release sleeve is bonded to the anchor, the threaded shaft connected to the release sleeve, wherein, the bond between the anchor and the release sleeve comprises a bonding strength such that, in response to a specified force, the release sleeve separates from the anchor along an interface between the release sleeve and break the bond along an interface between the release sleeve and the anchor the anchor to release at least a portion of the screw from the boss, releasing the component from the boss, wherein the bonding strength between the anchor and the release sleeve is less than a bonding strength between the anchor and the boss.

11. The system of claim 10, wherein the release sleeve comprises a sleeve groove shaped to modify the specified force.

12. The system of claim 10, wherein the specified force is substantially along a screw axis.

13. The apparatus of claim 10, wherein the interface between the anchor and the release sleeve is tapered.

14. The system of claim 10, wherein the force release component has an outer shape that is cylindrical and fits in a cylindrical opening in the boss.

15. The system of claim 10, wherein the screw secures the component to the boss by inserting the threaded shaft through an opening in the component and screwing the screw into the force release component, wherein a diameter of the opening of the component is less than an outer diameter of the head.

16. The system of claim 15, wherein the component is a first component and the boss is connected to second component, wherein the screw secures the first component to the boss and to the second component.

17. A method comprising:
providing a boss;
providing a screw comprising a head and a threaded shaft; and
providing a force release component connected to the boss and to the threaded shaft of the screw, the force release component comprising an anchor disposed within a recess of the boss and a release sleeve disposed within a recess of the anchor, the release sleeve is bonded to the anchor, the threaded shaft connected to the release sleeve, wherein, the bond between the anchor and the release sleeve comprises a bonding strength such that, in response to a specified force, the release sleeve separates from the anchor along an interface between the release sleeve and the anchor and break the bond along an interface between the release sleeve and the anchor to release at least a portion of the screw from the boss, wherein the bonding strength between the anchor and the release sleeve is less than a bonding strength between the anchor and the boss.

18. The method of claim 17, wherein the release sleeve comprises a sleeve groove shaped to modify the specified force.

19. The method of claim 17, wherein the force release component is release washer that separates from screw in response to the specified force.

\* \* \* \* \*